United States Patent
Bangel et al.

(10) Patent No.: US 6,901,401 B2
(45) Date of Patent: May 31, 2005

(54) SYSTEM AND METHOD FOR DATABASE INTEGRITY VIA LOCAL DATABASE LOCKOUT

(75) Inventors: Matthew Jay Bangel, Owego, NY (US); Victoria Hanrahan-Locke, Fishkill, NY (US); James A. Martin, Jr., Endicott, NY (US); Douglas G. Murray, Johnson City, NY (US)

(73) Assignee: International Business Machines Corporation, Armonk, NY (US)

( * ) Notice: Subject to any disclaimer, the term of this patent is extended or adjusted under 35 U.S.C. 154(b) by 439 days.

(21) Appl. No.: 10/105,096

(22) Filed: Mar. 21, 2002

(65) Prior Publication Data

US 2003/0187846 A1 Oct. 2, 2003

(51) Int. Cl.[7] ............................................. G06F 17/30
(52) U.S. Cl. ..................... 707/9; 707/2; 707/3; 707/8; 707/10
(58) Field of Search .................... 707/1–10, 100–104.1; 715/517–525

(56) References Cited

U.S. PATENT DOCUMENTS

| | | | |
|---|---|---|---|
| 5,737,601 A | | 4/1998 | Jain et al. ................... 707/201 |
| 5,774,717 A | | 6/1998 | Porcaro ....................... 707/202 |
| 5,806,075 A | | 9/1998 | Jain et al. ................... 707/201 |
| 5,991,771 A | | 11/1999 | Falls et al. .................. 707/202 |
| 6,081,810 A | * | 6/2000 | Rosenzweig et al. ..... 707/104.1 |
| 6,230,185 B1 | * | 5/2001 | Salas et al. ................. 715/513 |
| 6,332,146 B1 | * | 12/2001 | Jebens et al. ............ 707/104.1 |
| 6,571,256 B1 | * | 5/2003 | Dorian et al. ............ 707/104.1 |
| 6,697,806 B1 | * | 2/2004 | Cook .......................... 707/10 |

* cited by examiner

Primary Examiner—Jean M. Corrielus
Assistant Examiner—Isaac M. Woo
(74) Attorney, Agent, or Firm—Van Leeuwen & Van Leeuwen; Joseph T. Van Leeuwen; David A. Mims, Jr.

(57) ABSTRACT

A system and method is provided to perform a routine when the user attempts to access any document in a database. When the user attempts to access any document in the database, a call to a function is performed to determine whether the user is allowed to access a local copy of the database. The function determines whether the database is a local database. If the function determines that the database is running on the user's local machine then the function determines whether the user has permission to access the local copy of the database by searching through individual and group access control files. If the user is authorized, the function allows the user to access the local copy of the database. However, if the user is not authorized, an error message is displayed and the user is denied access to the local database copy.

17 Claims, 7 Drawing Sheets

SYSTEM AND METHOD FOR DATABASE INTEGRITY VIA LOCAL DATABASE LOCKOUT

BACKGROUND OF THE INVENTION

1. Technical Field

The present invention relates in general to a system and method for controlling local database usage. More particularly, the present invention relates to a system and method for controlling access to a local database replicated from a database server.

2. Description of the Related Art

Data integrity is an important aspect of database management. Enterprises retain large quantities of data in databases. Databases are maintained by database management systems (DBMSs), such as IBM's Lotus Notes™ database, which are specially designed to manage data. Management of data includes the ability to store, replicate, retrieve, and analyze data. Data is stored in databases so that it can be reliably retrieved at a later time and used in reports or other enterprise processes. Without solid data integrity, however, the ability to reliably retrieve data is compromised.

System failures can occur in hardware, communications, database software and application software. Data can be stored improperly, deleted, or become corrupted (i.e., can no longer be read). Errors can result from simple, expected malfunctions that happen even in today's advanced computers to poor database design, wrong choice of development software, or quickly built software. Depending upon security setups, data can be stolen, deleted, or mangled by malicious users or hackers.

When a piece of data in a database is damaged, the user may find out about it immediately because the system will either inform the user or crash. These types of problems can be repaired by reloading the database from a previous backup and re-entering your data.

More insidious, however, is the damage that goes undetected for a period of time. For example, an accounting record that has an amount changed. The software using the database may continue to execute without warning. Because of their nature, these types of errors are typically more difficult to identify and repair.

One way records can be damaged is when a user with access to the database copies the database onto a local computer system. Once on the local computer system, the user can often modify security settings stored in the database Access Control List (ACL) and modify database records. If the modified database stored on the user's local computer system is used in a production environment (i.e., either used from the user's local system or the database is copied back to the database server), replication conflicts and other data integrity problems can occur.

While it may be possible to completely block users from modifying a database stored on the user's computer system, there are some database users and administrators that may have legitimate needs to modify the database outside the database server. For example, if a database administrator is adding new fields, tables, or views to a database, the administrator may wish to test the effect of such changes in a non-production environment.

What is needed, therefore, is a system and method in which unauthorized users are prevented from using a database stored on their local computer systems while still allowing authorized users to make modifications to the database when stored on the authorized users' local computer system.

SUMMARY

It has been discovered that the aforementioned challenges are overcome by including a routine that is executed when the user attempts to access any document (i.e., table) in the database. In one embodiment, when the user attempts to access any document in the database, a call to a Check Local function is performed to determine whether the user is allowed to access a local copy of the database. In a Lotus Notes™ environment, the call to the Check Local function can be stored in the QueryOpen event corresponding with each view in the database.

The Check Local function determines whether the database is a local database (i.e., running on the user's computer system) or is running on a database server. If the function determines that the database is running on a server, then standard access checks are performed by the server using the database Access Control List (ACL) to determine what the user can do with the database. On the other hand, if the function determines that the database is running on the user's local machine then the function determines whether the user can access the local copy of the database. In order to make this determination, a configuration document and view are located in the database to identify users with key roles in the database. Users with key roles are allowed to access a local copy of the database.

The user's name is compared with names that are hard coded in the configuration document. In addition, any user groups that have key roles are analyzed to determine whether the user's name is included in any of the authorized groups. If the user is either hard coded as authorized or included in an authorized group, the function allows the user to access the local copy of the database. On the other hand, if the user is not authorized, an error message is displayed and the function does not allow the user to access any of the documents included in the local copy of the database.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

DETAILED DESCRIPTION

The following is intended to provide a detailed description of an example of the invention and should not be taken to be limiting of the invention itself. Rather, any number of variations may fall within the scope of the invention which is defined in the claims following the description.

Figure 1:
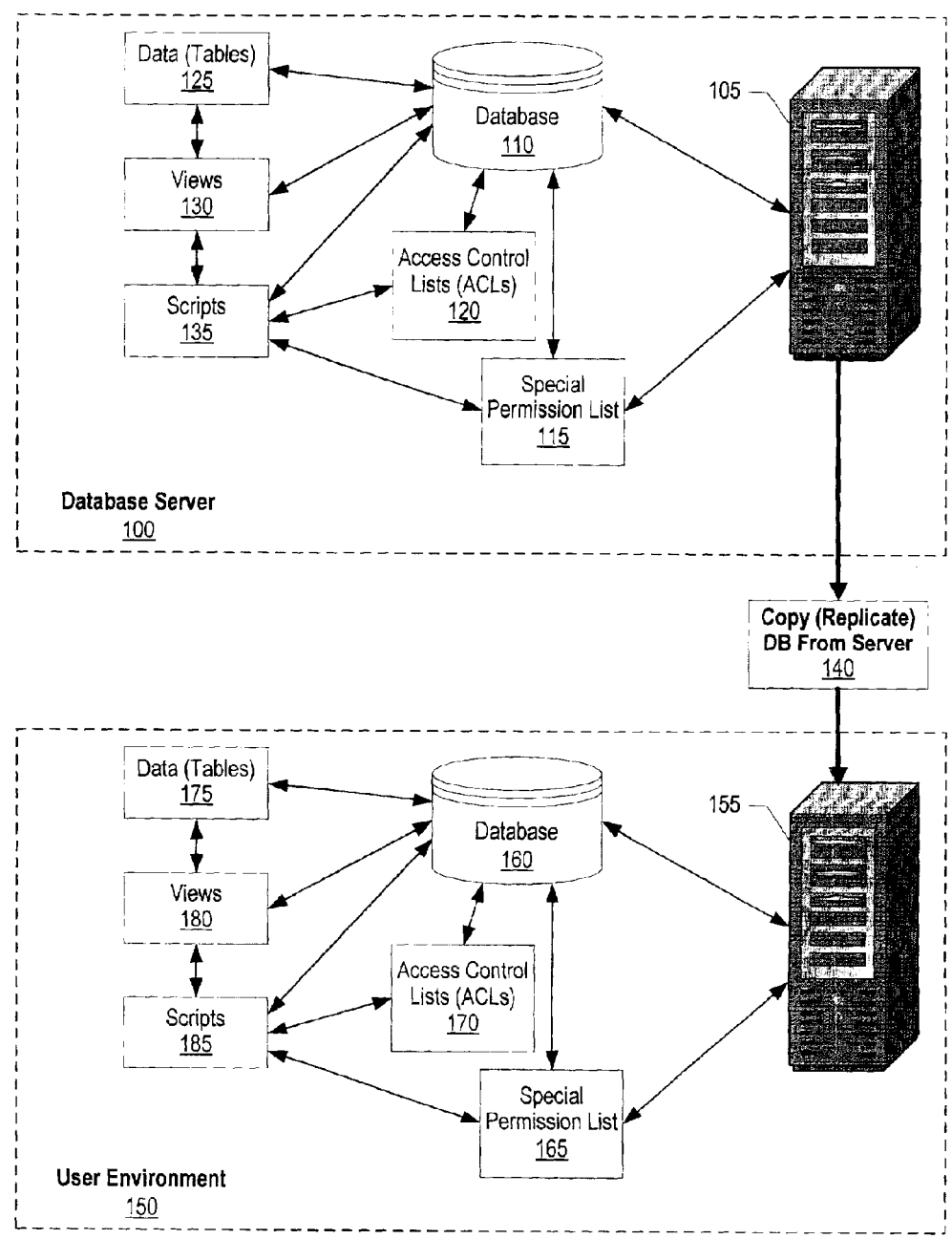
FIG. 1 is a high level diagram showing a database copied from a database server to a user's environment and components used to control access to database documents in the user's environment.

FIG. 1 is a high level diagram showing a database copied from a database server to a user's environment and components used to control access to database documents in the user's environment. Database server environment 100 includes server computer 105. Residing in server computer 105 is database 110 and special permission list 115. Database 110 includes one or more tables 125, corresponding to one or more views 130. Views 130 include one or more scripts 135. Scripts 135 include scripts used to control access to a local copy of database 110. Database 110 also includes Access Control Lists (ACLs 120) that include access control information used by the database engine to determine the access various users have to database tables, views, and other components. When a user access a table, a view corresponding to the table is opened. In addition, procedures, or scripts, corresponding to the view may be invoked and executed. A script can be designed to be executed whenever a table is opened or accessed. In a Lotus Notes™ environment, a QueryOpen event occurs whenever a table is opened or accessed. To prevent unauthorized access to a local copy of a database, code is invoked from the QueryOpen event to block unauthorized users from using local copies of the database. When this code is executed from a database server, however, the steps taken to control local database access are not performed and normal access control measures implemented through ACLs 120 are used by the database manager.

In the example shown in FIG. 1, database 110 is copied (i.e., replicated) from database server environment 100 to user environment 150 (step 140). After the replication, a copy of the database resides in user computer system 155. Database copy 160 is identical to database 110. Likewise, component of database copy 160 (tables 175, views 180, scripts 185, ACLs 170, and special permission list 165) are identical to the respective components of database 110. However, when local database copy 160 is accessed, scripts 185 that control local database access determine that the database is a local copy, or replica. When this determination is made, scripts 185 check special permission list 165 to determine whether the local user of local computer system 155 has permission to use a local database copy. If the user has such special permission, the scripts allow the user to access the database. On the other hand, if the user does not have such permission, the scripts display an error message and deny the user access to the local database copy.

Figure 2:
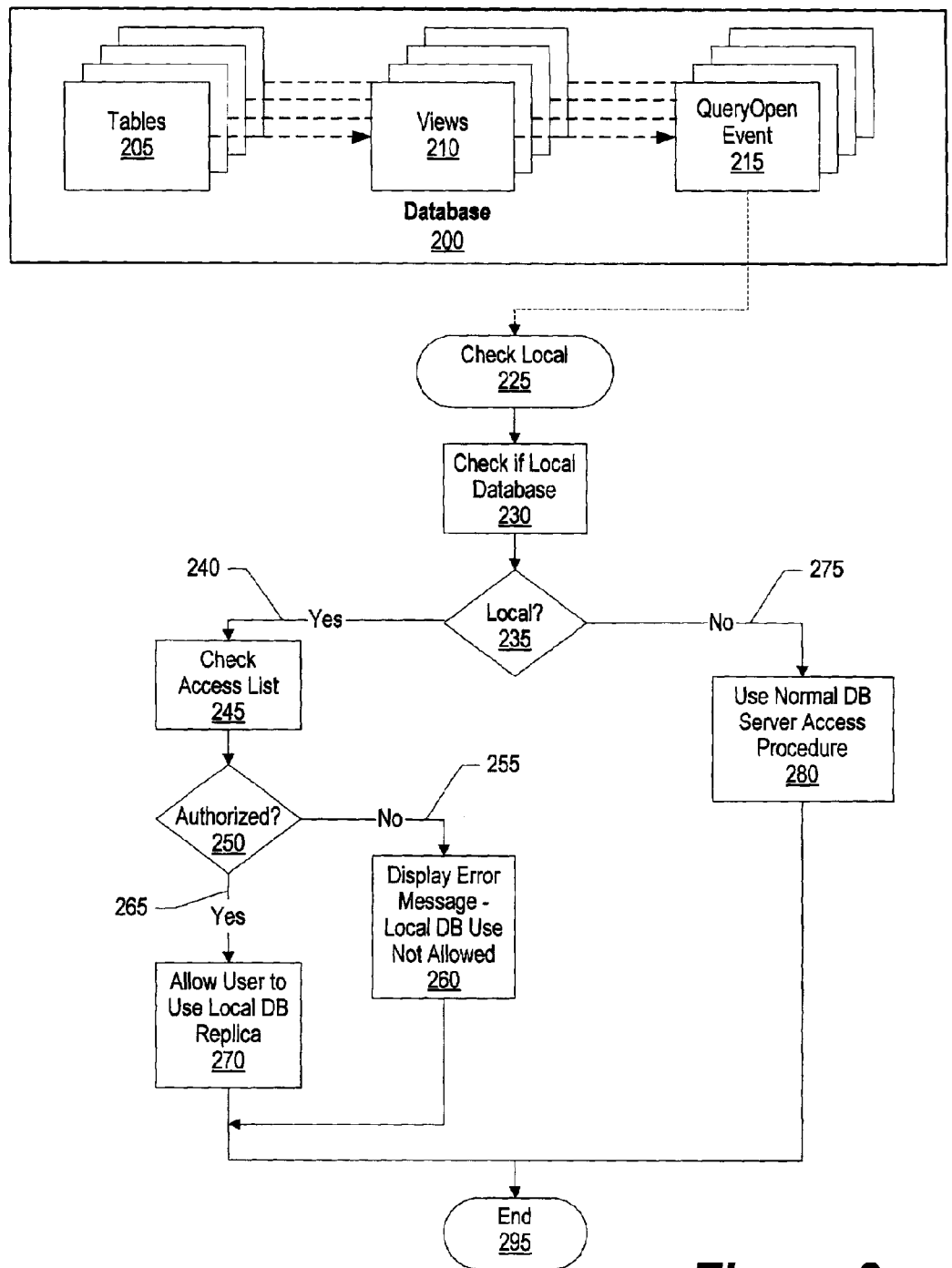
FIG. 2 shows QueryOpen events calling a check local function for a database.

FIG. 2 shows QueryOpen events calling a check local function for a database. Database 200 includes tables 205, views 210, and QueryOpen event handlers 215 which are invoked when views 210 are opened. Tables 205 are associated with one or more views 210. Views 210 each include QueryOpen event handler 215. The QueryOpen event handlers call a routine (Check Local 225) that determines whether the user is permitted to use a local copy of database 200.

The Check Local routine commences at 225 whereupon a check is made as to whether the database is being run from a local machine or a remote (i.e., database server) machine. A determination is made as to whether the database is being run from a local computer system (decision 235). If the database is not being run from a local computer system, decision 235 branches to "no" branch 275 whereupon normal database access procedures (i.e., the database checks the ACL to determine a user's access) are performed (step 280) and Check Local processing ends at 295.

On the other hand, if the database is being run from a local computer system, decision 235 branches to "yes" branch 240 whereupon a special permission list is searched in an attempt to locate the user name of the local machine (step 245). A determination is made as to whether the user name was found as a user authorized to have local access to the database (decision 250). If the user name was not found as an authorized user, decision 250 branches to "no" branch 255 whereupon an error message is displayed to the user and the user is denied access to the local copy of the database. On the other hand, if the user name is found in the special permission list as a user with permission for local access to the database, decision 250 branches to "yes" branch 265 whereupon the user is permitted to use the database table and view. In one embodiment, QueryOpen event handler 215 receives a return code from the Check Local routine and either opens the table and view or displays an error message, depending on the return code.

Figure 3:
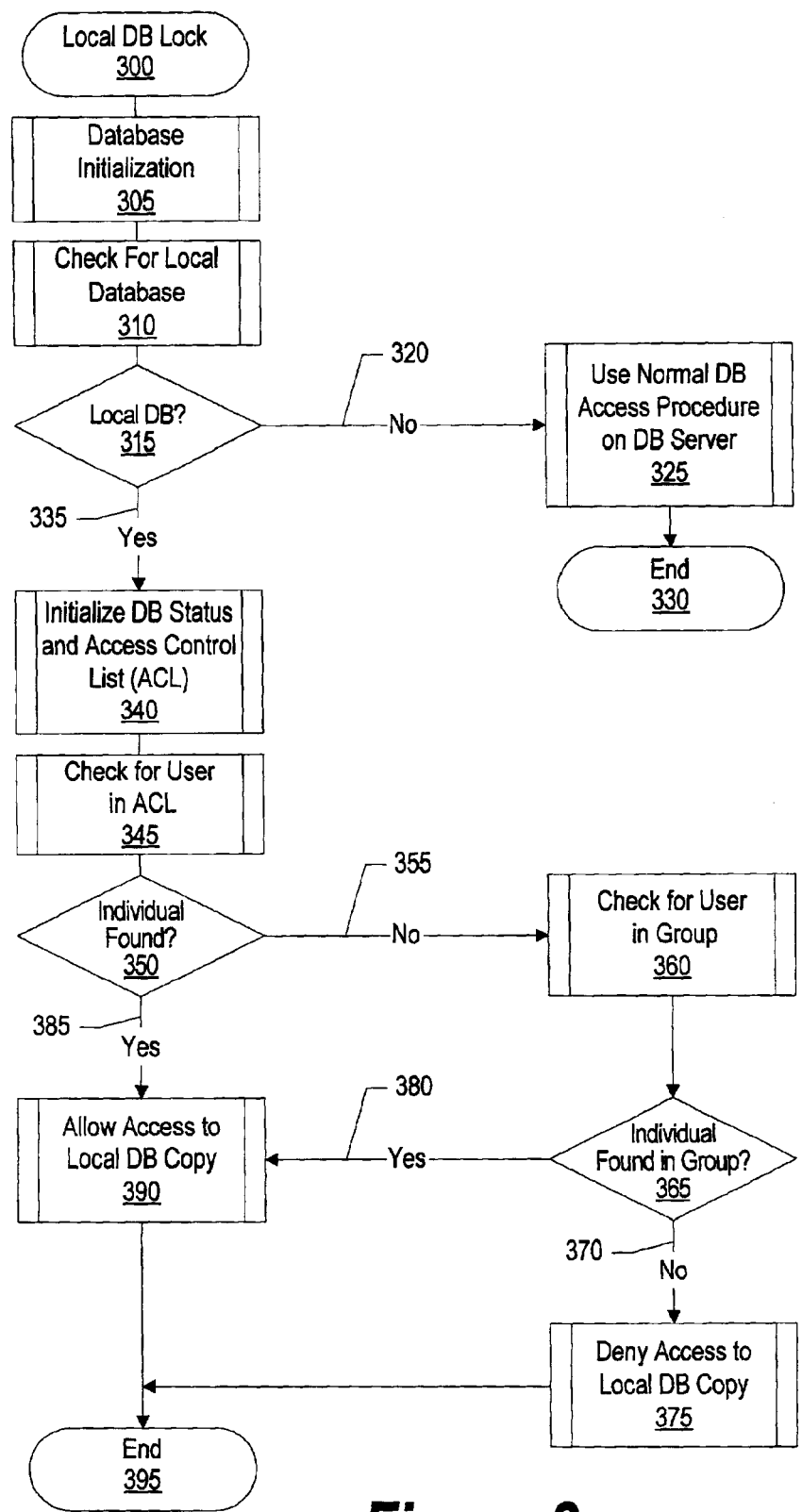
FIG. 3 is a high level flowchart showing local database lock processing.

FIG. 3 is a high level flowchart showing local database lock processing. Processing commences at 300 whereupon database variables are initialized (predefined process 305, see FIG. 4, steps 405 and 410 for further details). A check is then made to ascertain the computer system that is running the database (predefined process 310, see FIG. 4, steps 405 & 415 for further details.

A determination is made as to whether the database is running on the user's local computer system (decision 315). If the database is not running on the user's local computer system, decision 315 branches to "no" branch 320 whereupon normal database access procedures are performed by the database server to determine what actions the user is allowed to take with the database (predefined process 325) and processing ends at 330.

Figure 4:
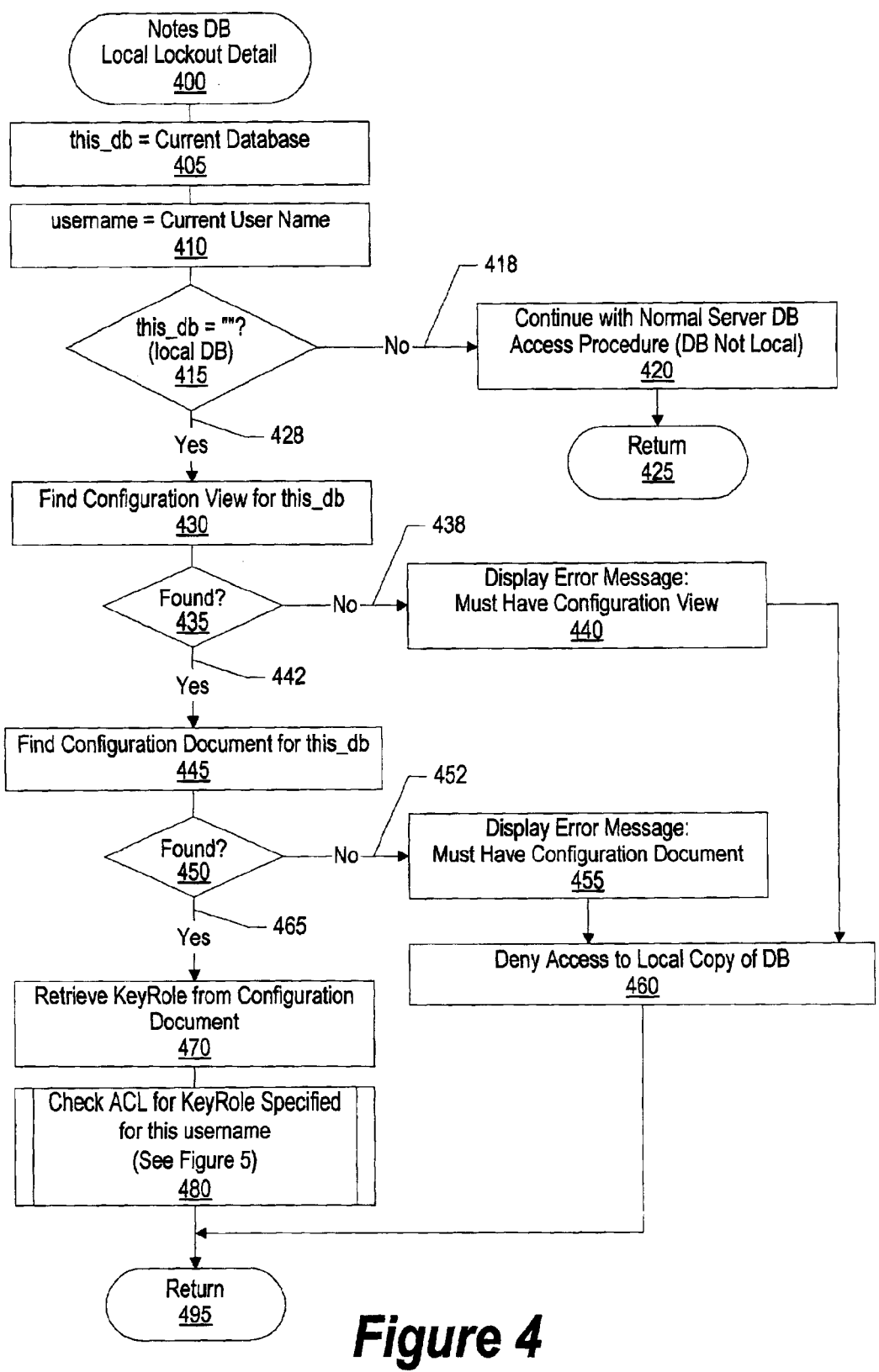
FIG. 4 is a flowchart showing lockout initialization steps for a Lotus Notes lockout implementation.

On the other hand, if the database is running on the user's local computer system, decision 315 branches to "yes" branch 325 whereupon the database status and access control lists are initialized (predefined process 340, see FIG. 4, steps 430 through 470 for further details). A check is made to ascertain whether the local user has special permission to access a local copy of the database (predefined process 345, see FIG. 4 step 480 and FIG. 5 for further details). A determination is made as to whether the individual user's user name was found as having special permission to access a local copy of the database (decision 350). If the individual's user name was found as having special permission, decision 350 branches to "yes" branch 385 whereupon the user is allowed access to the local copy of the database (predefined process 390). In one embodiment, a QueryOpen event handler receives an authorization message or return code and permits the user to access a table and view that the user was attempting to open.

Figure 5:
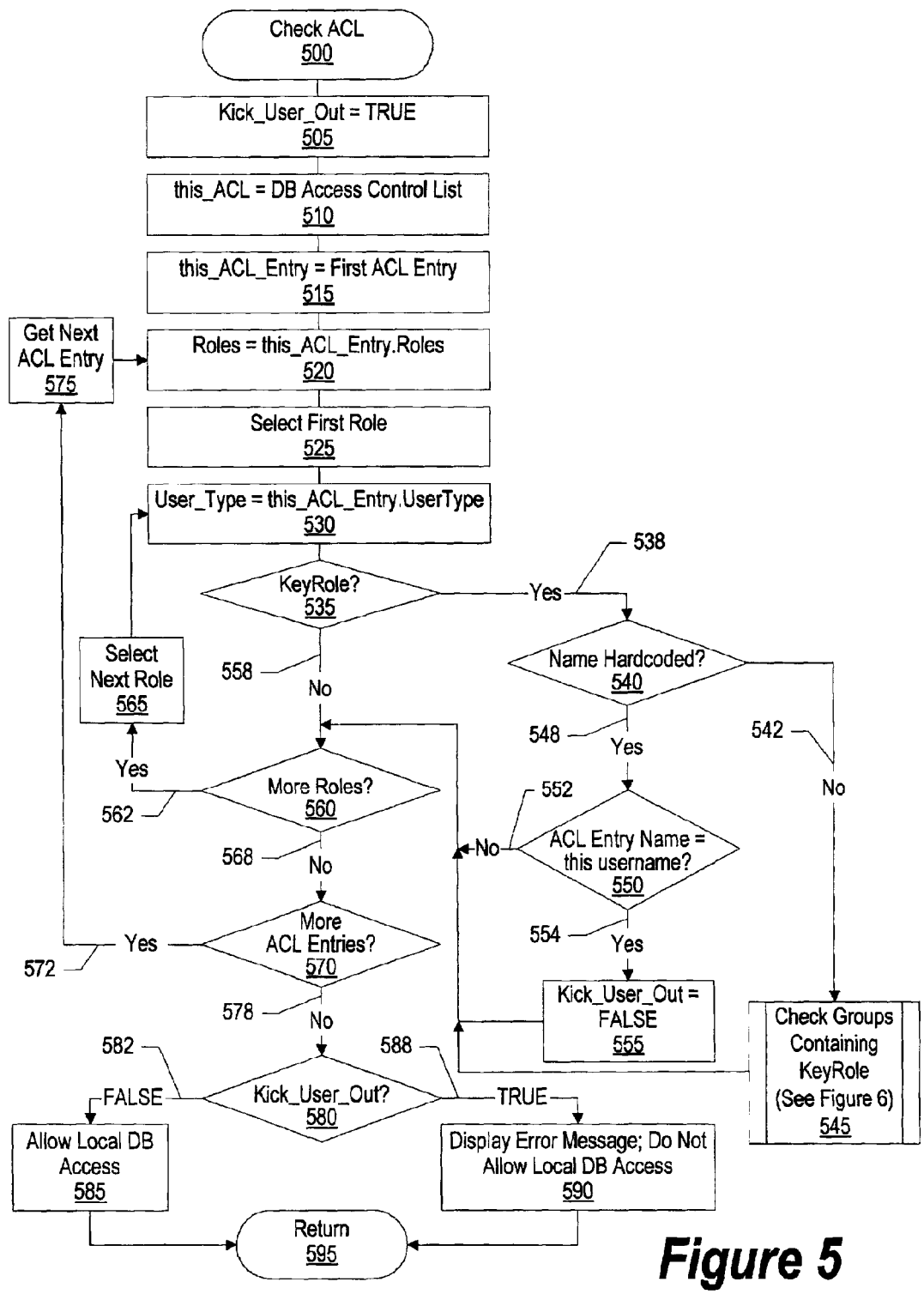
FIG. 5 is a flowchart showing ACL checking steps for a Lotus Notes lockout implementation.
Figure 6:
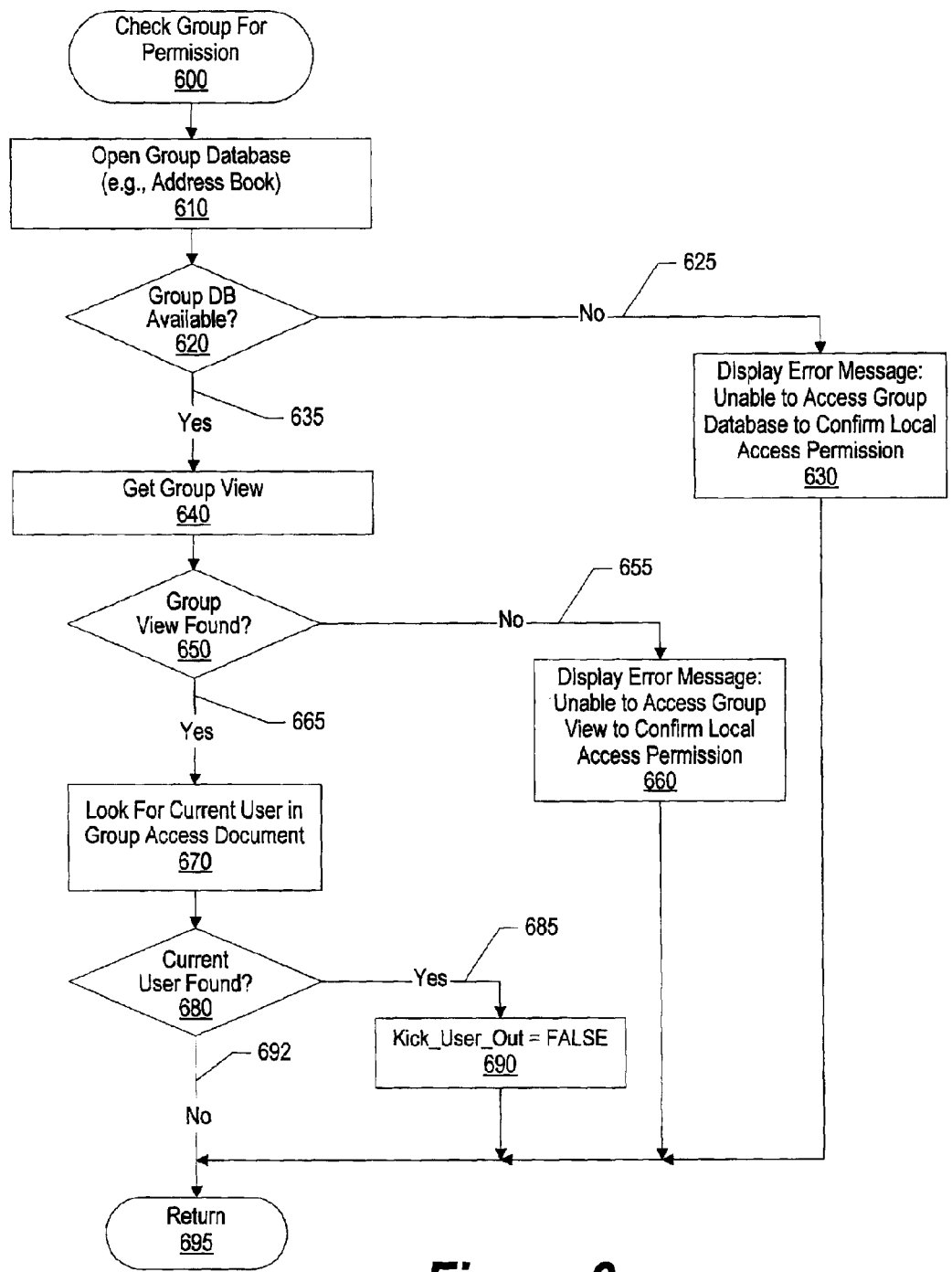
FIG. 6 is a flowchart showing group checking steps for a Lotus Notes lockout implementation.

On the other hand, if the user's user name was not found, decision 350 branches to "no" branch 355 whereupon a check is made to ascertain whether the user's user name is included in any groups that have special permission to access a local copy of the database (predefined process 360, see FIG. 6 for further details). A determination is made as to whether the user's user name is included in any groups that have special permission to access a local copy of the database (decision 365). If the user's user name is included in such groups, decision 365 branches to "yes" branch 380 whereupon the user is allowed access to the local copy of the database (predefined process 390). On the other hand, if the user's user name is not included in such groups, decision 365 branches to "no" branch 370 whereupon the user is denied access to the local copy of the database (predefined process 375, see FIG. 5 decision 580 and step 590 for further details).

After the user has either been allowed or denied access to the local database, processing ends at 395.

FIG. 4 is a flowchart showing lockout initialization steps for a Lotus Notes lockout implementation. Processing commences at 400 whereupon a variable is set to the current database (step 405). Code to accomplish this in a Lotus Notes™ environment is as follows:
Dim session as New NotesSession
Dim this_db as NotesDatabase
Set this_db=session.CurrentDatabase The user's username is then retrieved (step 410). Code to accomplish this in a Lotus Notes™ environment is as follows:
Set username=New NotesName (session.UserName)

A determination is made as to whether the database is running from the user's local computer system (decision 415). Code to accomplish this in a Lotus Notes™ environment is as follows:
If this_db.Server="" Then . . . .

If the user is not running the database from the user's local computer system, decision 415 branches to "no" branch 418 whereupon the lockout routine takes no action and database access routines located on the server determine the access allowed for the user (step 420), and lockout processing ends at 425.

On the other hand, if the user is running the database from the user's local computer system, decision 415 branches to "yes" branch 428 whereupon a configuration view for the database is located (step 430). Code to accomplish this in a Lotus Notes™ environment is as follows:
Dim configView as NotesView
set configView=this_db.Getview("importsettings")

A determination is made as to whether the configuration view was located (decision 435). Code to accomplish this in a Lotus Notes™ environment is as follows:
If configView Is Nothing Then . . . .

If the configuration view was not found, decision 435 branches to "no" branch 438 whereupon an error message is displayed (step 440), the user is denied access to the local database (step 460) and processing ends at 495. Code to accomplish this in a Lotus Notes™ environment is as follows:

---

If configView is Nothing Then
    Messagebox("You cannot use local db without a configuration view")
    CheckLocal = False
    Exit Function
End If

---

Code to process this in the QueryOpen event handler in the database view that the user was attempting to open in a Lotus Notes™ environment is as follows:

---

Sub QueryOpen(Source as Notesuiview, Continue as Variant)
    continue = CheckLocal   'CheckLocal is the routine shown above
End Sub

---

In this manner, a small code segment added to all QueryOpen events can be used to prevent unauthorized local database access.

If the configuration view was found, decision 435 branches to "yes" branch 442 whereupon a configuration document for the database is located (step 445). Code to accomplish this in a Lotus Notes™ environment is as follows:
Dim configdoc as NotesDocument
Set configdoc=configview.GetDocumentByKey ("ImportSetting")

A determination is made as to whether the configuration document was located (decision 450). Code to accomplish this in a Lotus Notes™ environment is as follows:
If configdoc Is Nothing Then . . .

If the configuration document was not found, decision 450 branches to "no" branch 452 whereupon an error message is displayed (step 455), the user is denied access to the local database (step 460) and processing ends at 495. Code to accomplish this in a Lotus Notes™ environment is as follows:

---

If configdoc is Nothing Then
    Messagebox("You cannot use local db without a configuration document")
    CheckLocal = False
    Exit Function
End if

---

The QueryOpen event handler (described above) in the database view that the user was attempting then prevents the user from using the view that was being accessed.

On the other hand, if the configuration document was found, decision 450 branches to "yes" branch 464 whereupon a key role is retrieved from the configuration document (step 470). A key role is used to determine whether the current user has a key role and, therefore, whether the user is permitted to use a local database copy. Code to accomplish this in a Lotus Notes™ environment is as follows:
KeyRole=configDoc.AdminRole(0)

Next, the Lotus Notes access control list (ACL) is searched to determine whether the user has a key role and is therefore allowed to use a local copy of the database (predefined process 480, see FIG. 5 for further details). Processing thereafter ends at 495.

FIG. 5 is a flowchart showing ACL checking steps for a Lotus Notes lockout implementation. Processing commences at 500 whereupon a flag is initialized (step 505). In one embodiment, the flag is initialized to assume that the user will not be allowed access to a local database. Code to accomplish this in a Lotus Notes™ environment is as follows:
Dim kick_out as Variant
kick_out=True Members of the Access Control List are initialized in order to search the ACL and determine whether the user is allowed access to a local copy of the database (step 510). Code to accomplish this in a Lotus Notes™ environment is as follows:
Dim this_ACL as NotesACL
Dim this_ACLentry as NotesACLEntry
Set this_ACL=this_db.ACL The ACL entry is initialized to the first entry in the ACL list (step 515). Code to accomplish this in a Lotus Notes™ environment is as follows:
Set this_ACLentry=this_ACL.GetFirstEntry Roles are retrieved for the ACL entry (step 520) and a loop is initiated to process all ACL entries. Code to accomplish this in a Lotus Notes™ environment is as follows:

While Not(this_ACLentry Is Nothing)
temp_roles=this_ACLentry.Roles

The first role is selected (step 525) and will be compared to the retrieved Key Role to determine whether the role is a key role. The user type for the current user is retrieved from the current ACL entry (step 530). Code to accomplish this in a Lotus Notes™ environment is as follows:
user_type=this_ACLentry.UserType A loop is initiated to check each role and compare it to the key roles retrieved from the configuration document. Code to accomplish this in a Lotus Notes™ environment is as follows:
Forall n In temp_roles A determination is made as to whether the role corresponding to the user is a key role (decision 535). Code to accomplish this in a Lotus Notes™ environment is as follows:
If n=KeyRole Then . . . .

If the role is a keyrole, then decision 535 branches to "yes" branch 538 whereupon a determination is made as to whether the username is hardcoded as someone with the authorization to access a local copy of the database (decision 540). In one embodiment, user types of "0" or "1" signify someone hardcoded in the ACL. If the name is hardcoded, decision 540 branches to "yes" branch 548 whereupon a determination is made as to whether the username in the ACL is the same as the user's username (decision 550). If the user types match and the username matches, then the user is allowed to access the local database copy (step 555). If the name is not hardcoded, then decision 540 branches to "no" branch 542 whereupon access groups are checked to see if the user is a member of a group that is authorized to use a local copy of the database (predefined process 545, see FIG. 6 for further details). In one embodiment, user types of "3" or "4" signify a group type. Code to accomplish this in a Lotus Notes™ environment is as follows:

```
If user_type = 0 Or user_type = 1 Then
    If this_ACLentry.Name = username.Abbreviated Then
        kick_out = False
    End if
End If
If user_type = 3 Or user_type = 4 Then
    <Check groups, see Figure 6 description for details>
End If
```

A determination is made as to whether more roles need to be processed (decision 560). If there are more roles to process, decision 560 branches to "yes" branch which selects the next role (step 565) and loops back to process the role. When all roles have been processed, decision 560 branches to "no" branch 568. Code to loop through roles in a Lotus Notes™ environment is as follows:

```
Forall n In temp_roles
    <Check user types and key roles, see above>
End Forall
```

A determination is made as to whether there are more ACL entries to process (decision 570). If there are more ACL entries to process, decision 570 branches to "yes" branch 572 whereupon the next ACL entry is retrieved (step 575) and processing loops back to process the retrieved entry. This looping continues until all ACL entries have been processed, at which time decision 578 branches to "no" branch 578. Code to accomplish this in a Lotus Notes™ environment is as follows:

```
while Not(this_ACLentry Is Nothing)
    <See above for details in processing the ACL entry>
Wend
```

A determination is made as to whether the user should be allowed to use the local database copy (decision 580). If the user should be allowed, decision 580 branches to "FALSE" branch 582 whereupon the user is allowed to use the views and tables (step 585). On the other hand, if the user should not be allowed to use the local copy, decision 580 branches to "TRUE" branch 588 whereupon a message is displayed to the user and the user is not allowed to use the local database copy (step 590). Code to accomplish this in a Lotus Notes™ environment is as follows:

```
If kick_out = True Then
    Messagebox("You cannot use this database locally")
End If
CheckLocal = Not(kick_out)    'Return opposite of kick_out variable
                              'to QueryOpen routine
```

The CheckLocal variable is returned to the QueryOpen event handler (see above for details of the handler). Processing thereafter ends at 585.

FIG. 6 is a flowchart showing group checking steps for a Lotus Notes lockout implementation. Processing commences at 600 whereupon a table or document that includes group information is opened (step 610). A determination is made as to whether the group database is available (decision 620). If the group database is not available, decision 620 branches to "no" branch 625 whereupon an error message is displayed (step 630) indicating that the routine was not able to access the group database to confirm local access permission, and processing returns at 695.

On the other hand, if the group database is available, decision 620 branches to "yes" branch 635 whereupon a group view is retrieved (step 640). A determination is made as to whether the group view was found (decision 650). If the group view was not found, decision 650 branches to "no" branch 655 whereupon an error message is displayed (step 660) indicating that the routine was unable to access the group view to confirm local access permission, and processing returns at 695.

On the other hand, if the group view was found, decision 660 branches to "yes" branch 665 whereupon the group access document (i.e., table) is searched for the username corresponding to the current user (step 670). A determination is made as to whether the current user was found in the document containing usernames permitted to use a local copy of the database (decision 680). If the current user is found, decision 680 branches to "yes" branch 685 whereupon a variable is set indicating that the user is allowed to use a local copy of the database (step 690) and processing returns at 695. On the other hand, if the current user is not found, decision 680 branches to "no" branch 692 leaving the variable is not changed (i.e., the default value of the variable is to block access and this value is not changed) and processing returns at 695.

Code to accomplish the processing tasks outlined in FIG. 6 (in a Lotus Notes™ environment) are as follows:

```
If user_type = 3 Or user_type = 4 Then 'If not hardcoded, check groups
   group_name = this_aclentry.Name
   'Go out to the Address book and get the group
   'Initialize Address Variables
   Dim Addr_db As New NotesDatabase("","")
   Dim Addr_view As NotesView
   Dim Addr_doc As NotesDocument
   'Open the Address book Database
   Addr_server = configDoc.DestDBServer(0)
   Addr_pathFN = "names.nsf"
   Call Addr_db.Open(Addr_server, Addr_pathFN) 'If cannot open the
                                               'Notes address book that contains
                                               'those groups, or the group itself we
                                               'exit the DB
   If Not(Addr_db.IsOpen) Then
      Messagebox("This database was not able to contact the Address book
         on the server to verify if you have the correct access to
         modify this local copy. The database will not be opened.")
      CheckLocal = False
      Exit Function
   End If
   'Get the view for the address book
   Set Addr_view = Addr_db.GetView("Groups")
   If Addr_view Is Nothing Then
      Messagebox("This database was not able to find the Address book
         view on the server to verify if you have the correct access
         to modify this local copy. The database will not be
         opened.")
      CheckLocal = False
      Exit Function
   End if
   'Get the document in the address book for the entry
   Set Addr_doc = Addr_view.GetDocumentByKey(this_aclentry.Name)
   If Not(Addr_doc Is Nothing) Then
      Set temp_item = Addr_doc.GetFirstItem("Members")
      If temp_item.Contains(username.Canonical ) Then
         kick_out = False
         'Look for the current user in the address book group when it is
            found, the canonical part here matches the usernames Notes
            E-mail name (how the ACL is done in Notes) If the person is
            found in the proper group we don't kick them out of the
            DB, and we can enter
      End If
   End If
End If
```

Figure 7:
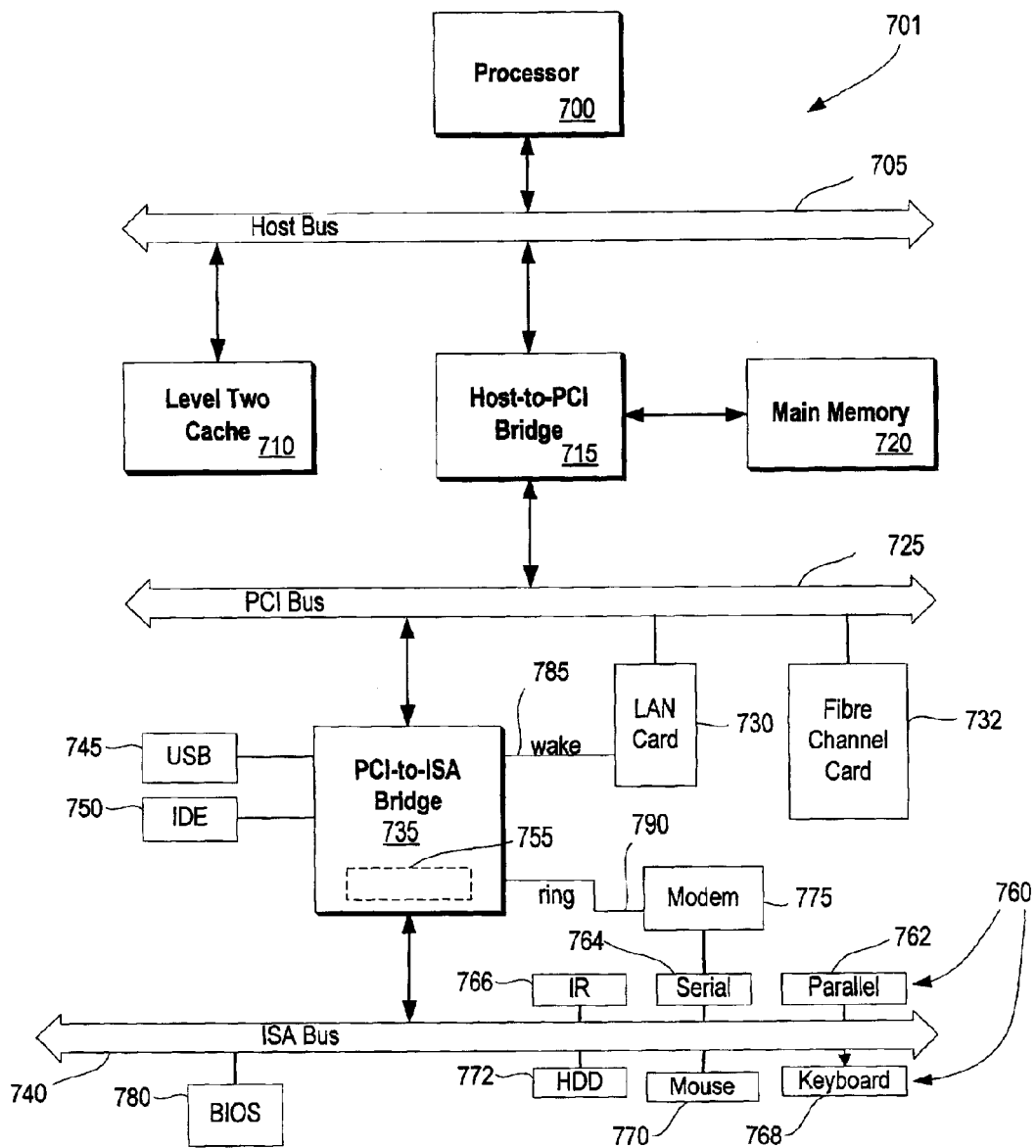
FIG. 7 is a block diagram of an information handling system capable of implementing the present invention.

FIG. 7 illustrates information handling system 701 which is a simplified example of a computer system capable of performing the computing operations described herein. Computer system 701 includes processor 700 which is coupled to host bus 705. A level two (L2) cache memory 710 is also coupled to the host bus 705. Host-to-PCI bridge 715 is coupled to main memory 720, includes cache memory and main memory control functions, and provides bus control to handle transfers among PCI bus 725, processor 700, L2 cache 710, main memory 720, and host bus 705. PCI bus 725 provides an interface for a variety of devices including, for example, LAN card 730. PCI-to-ISA bridge 735 provides bus control to handle transfers between PCI bus 725 and ISA bus 740, universal serial bus (USB) functionality 745, IDE device functionality 750, power management functionality 755, and can include other functional elements not shown, such as a real-time clock (RTC), DMA control, interrupt support, and system management bus support. Peripheral devices and input/output (I/O) devices can be attached to various interfaces 760 (e.g., parallel interface 762, serial interface 764, infrared (IR) interface 766, keyboard interface 768, mouse interface 770, and fixed disk (HDD) 772) coupled to ISA bus 740. Alternatively, many I/O devices can be accommodated by a super I/O controller (not shown) attached to ISA bus 740.

BIOS 780 is coupled to ISA bus 740, and incorporates the necessary processor executable code for a variety of low-level system functions and system boot functions. BIOS 780 can be stored in any computer readable medium, including magnetic storage media, optical storage media, flash memory, random access memory, read only memory, and communications media conveying signals encoding the instructions (e.g., signals from a network). In order to attach computer system 701 to another computer system to copy files over a network, LAN card 730 is coupled to PCI bus 725 and to PCI-to-ISA bridge 735. Similarly, to connect computer system 701 to an ISP to connect to the Internet using a telephone line connection, modem 775 is connected to serial port 764 and PCI-to-ISA Bridge 735.

While the computer system described in FIG. 7 is capable of executing the invention described herein, this computer system is simply one example of a computer system. Those skilled in the art will appreciate that many other computer system designs are capable of performing the invention described herein.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the Introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method for controlling access to one or more database files, said method comprising:

deciding whether a local copy of a database is running on a computer system, wherein the local copy of the database is replicated from a server copy of the database, and wherein the local copy of the database is identical to the server copy of the database at the time of replication;

in response to deciding that the local copy of the database is running on the computer system, determining whether a user of the computer system is authorized to use the local copy of the database, wherein the determining includes:

retrieving one or more access control entries correspond in to the local copy of the database;

matching a user role corresponding to one or more of the access control entries to a key role, wherein the key role indicates roles allowed to use the local copy of the database; and deciding whether a usernname corresponding to the user is authorized to use the local copy of the database in response to the matching;

denying the user access to the database files in the local copy of the database in response to determining that the user is not authorized; and allowing the user access to the database files in the local copy of the database in response to determining that the user is authorized.

2. The method as described in claim 1 wherein the determining further comprises:

locating a username corresponding to the user in an access control list, wherein the access control list is related to the local copy of the database.

3. The method as described in claim 1 wherein the determining further comprises:

locating a username corresponding to the user in one or more group access files, wherein each of the group access files include one or more usernames and each of the group access flies is related to the local copy of the database.

4. The method as described in claim 1 wherein the determining further comprises:

locating a configuration view and a configuration document corresponding to the local copy of the database;

retrieving one or more key roles from the configuration document; and determining whether a user entry corresponding to the user includes a user role that matches the key role.

5. The method as described in claim 4 wherein the determining further comprises:

retrieving a user type corresponding to the user, wherein the user type indicates that the user is a member of a database access group;

locating a group access document and a group view corresponding to the local copy of the database; and searching the group access document for a username corresponding to the user.

6. The method as described in claim 1 further comprising:

processing a script called from one or more views of the local copy of the database, wherein the script performs the deciding, determining, denying, and allowing steps.

7. An information handling system comprising:

one or more processors;

a memory accessible by the processors;

a nonvolatile storage area for storing database files;

a database access tool for controlling access to a database, the database access tool including:

means for deciding whether a local copy of a database is running on a computer system, wherein the local copy of the database is replicated from a server copy of the database, and wherein the local copy of the database is identical to the server copy of the database at the time of replication;

means for determining whether a user of the computer system is authorized to use the local copy of the database, wherein said means for determining includes:

means for retrieving one or more access control entries corresponding to the local copy of the database;

means for matching a user role corresponding to one or more of the access control entries to a key role, wherein the key role indicates roles allowed to use the local copy of the database; and means for deciding whether a username corresponding to the user is authorized to use the local copy of the database in response to the matching;

means for denying the user access to the database files in the local copy of the database in response to determining that the user is not authorized; and means for allowing the user access to the database files in the local copy of the database in response to determining that the user is authorized.

8. The information handling system as described in claim 7 wherein the means for determining further comprises:

means for locating a username corresponding to the user in an access control list, wherein the access control list is related to the local copy of the database.

9. The information handling system as described in claim 7 wherein the means for determining further comprises:

means for locating a username corresponding to the user in one or more group access files, wherein each of the group access files include one or more usernames and each of the group access files is related to the local copy of the database.

10. The information handling system as described in claim 7 wherein the means for determining further comprises:

means for locating a configuration view and a configuration document corresponding to the local copy of the database;

means for retrieving one or more key roles from the configuration document; and means for determining whether a user entry corresponding to the user includes a user role that matches the key role.

11. The information handling system as described in claim 10 wherein the means for determining further comprises:

means for retrieving a user type corresponding to the user, wherein the user type indicates that the user is a member of a database access group;

means for locating a group access document and a group view corresponding to the local copy of the database; and means for searching the group access document for a username corresponding to the user.

12. A computer program product stored in a computer operable media for controlling access to one or more database files, said computer program product comprising:

means for deciding whether a local copy of a database is running on a computer systems wherein the local copy of the database is replicated from a server copy of the database, and wherein the local copy of the database is identical to the server copy of the database at the time of replication;

means for determining whether a user of the computer system is authorized to use the local copy of the database, wherein the means for determining includes:

means for retrieving one or more access control entries corresponding to the local copy of the database;

means for matching a user role corresponding to one or more of the access control entries to a key role, wherein the key role indicates roles allowed to use the local copy of the database; and means for deciding whether a username corresponding to the user is authorized to use the local copy of the database in response to the matching;

means for denying the user access to the database files in the local copy of the database in response to determining that the user is not authorized; and means far allowing the user access to the database files in the local copy of the database in response to determining that the user is authorized.

13. The computer program product as described in claim 12 wherein the means for determining further comprises:

means for locating a username corresponding to the user in an access control list, wherein the access control list is related to the local copy of the database.

14. The computer program product as described in claim 12 wherein the means for determining further comprises:

means for locating a username corresponding to the user in one or more group access files, wherein each of the group access files include one or more usernames and each of the group access files is related to the local copy of the database.

15. The computer program product as described in claim 12 wherein the means for determining further comprises:

means for locating a configuration view and a configuration document corresponding to the local copy of the database;

means for retrieving one or more key roles from the configuration document; and means for determining whether a user entry corresponding to the user includes a user role that matches the key role.

16. The computer program product as described in claim 15 wherein the means for determining further comprises:

means for retrieving a user type corresponding to the user, wherein the user type indicates that the user is a member of a database access group;

means for locating a group access document and a group view corresponding to the local copy of the database; and means for searching the group access document for a username corresponding to the user.

17. The computer program product as described in claim 12 further comprising:

means for processing a script called from one or more views of the local copy of the database, wherein the script includes the means for deciding, the means for determining, the means for denying, and the means for allowing.

* * * * *